(12) United States Patent
Hasegawa et al.

(10) Patent No.: US 6,245,852 B1
(45) Date of Patent: Jun. 12, 2001

(54) PREPARATION OF ORGANOPOLYSILOXANE EMULSION

(75) Inventors: Kohei Hasegawa; Satoshi Kuwata, both of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/372,983

(22) Filed: Aug. 12, 1999

(30) Foreign Application Priority Data

Aug. 12, 1998 (JP) .................................................. 10-241132

(51) Int. Cl.$^7$ ....................................................... C08K 5/42
(52) U.S. Cl. .......................... 524/837; 524/745; 524/858; 524/860; 528/23; 516/58
(58) Field of Search .................................... 524/837, 806, 524/745, 858, 860; 528/23

(56) References Cited

U.S. PATENT DOCUMENTS

| | | |
|---|---|---|
| 3,360,491 | * 12/1967 | Axon . |
| 3,697,469 | 10/1972 | Ikoma . |
| 4,228,054 | * 10/1980 | Ona et al . |
| 5,726,270 | * 3/1998 | Craig . |
| 5,817,714 | * 10/1998 | Graiver et al. . |
| 5,895,794 | * 4/1999 | Berg et al. . |
| 5,925,469 | * 7/1999 | Gee . |
| 6,071,975 | * 6/2000 | Halloran . |

FOREIGN PATENT DOCUMENTS

| | | |
|---|---|---|
| 686812A | 4/1964 | (BE) . |
| 342041 | 1/1931 | (JP) . |
| 4113995 | 8/1941 | (JP) . |
| 54-19440 | 7/1979 | (JP) . |

\* cited by examiner

Primary Examiner—Robert Dawson
Assistant Examiner—Marc Zimmer

(57) ABSTRACT

A stable organopolysiloxane emulsion is briefly prepared by emulsifying and dispersing a low molecular weight organopolysiloxane (A) in water in the presence of an organic sulfonic acid or organic sulfate anionic surfactant (B) to form an initial emulsion having a mean particle size of up to 300 nm, and effecting polymerization reaction, followed by neutralization.

18 Claims, No Drawings

PREPARATION OF ORGANOPOLYSILOXANE EMULSION

This invention relates to a method for preparing an organopolysiloxane emulsion having improved stability.

BACKGROUND OF THE INVENTION

Organopolysiloxane emulsions are useful as parting agents for synthetic resins, rubber, paper and molds, coating agents on synthetic resin films and sheets and paper, water-repellents, softeners or lubricating agents for organic fibers (e.g., natural fibers and synthetic fibers) and inorganic fibers (e.g., glass fibers), emulsion paint, and anti-foaming agents. Of these organopolysiloxane emulsions, those emulsions of a small particle size prepared by emulsion polymerization are sometimes preferred from the considerations of stability and a high degree of polymerization. Such emulsion polymerized products are prepared by various methods. For example, JP-B 34-2041 discloses polymerization using strong acids or strong alkalis as the polymerization catalyst. JP-B 41-13995, Belgian Patent No. 686812 and U.S. Pat. No. 3,360,491 disclose polymerization using alkylbenzene sulfonic acids, alkyl-naphthalene sulfonic acids, aliphatic sulfonic acids, silylalkylsulfonic acids, aliphatically-substituted diphenyl ether sulfonic acids or alkylhydrogen-sulfates as the polymerization catalyst. JP-B 54-19440 discloses a polymerization process involving emulsifying and dispersing an oligomer of diorganosiloxane (consisting of 3 to 6 monomer units) in a salt type surfactant aqueous solution, adding an ion exchange resin to the dispersion, and effecting ion exchange of the salt type surfactant. Since all these processes take a long time for polymerization, a rapid process is desired.

SUMMARY OF THE INVENTION

An object of the invention is to provide a novel and improved method for preparing an organopolysiloxane emulsion having improved stability within a short time.

Regarding a method of preparing an organopolysiloxane emulsion by emulsifying and dispersing a low molecular weight organopolysiloxane (A) in water in the presence of at least one anionic surfactant (B) selected from organic sulfonic acids and organic sulfates to form an initial emulsion and effecting polymerization, the inventors have found that by reducing the mean particle size of the initial emulsion to 300 nm or less, the polymerization time is reduced and the resulting organopolysiloxane emulsion is improved in stability.

Accordingly, the invention provides a method for preparing an organopolysiloxane emulsion comprising the steps of emulsifying and dispersing a low molecular weight organopolysiloxane (A) in water (C) in the presence of at least one anionic surfactant (B) selected from organic sulfonic acids and organic sulfates to form an initial emulsion having a mean particle size of up to 300 nm, subjecting the initial emulsion to polymerization, and neutralizing the emulsion.

DESCRIPTION OF THE PREFERRED EMBODIMENTS

Component (A)

The method for preparing an organopolysiloxane emulsion according to the invention starts with a low molecular weight organopolysiloxane. Any desired low molecular weight organopolysiloxane may be used although it is preferably a cyclic organopolysiloxane, a linear organopolysiloxane end-blocked with a triorganosilyl, diorganomonohydroxysilyl or diorganomonoalkoxysilyl group, or a mixture thereof.

The cyclic organopolysiloxanes used herein are preferably those of the general formula (I):

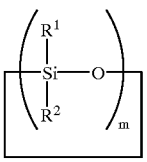

wherein $R^1$ and $R^2$ are independently hydrogen or monovalent hydrocarbon groups of 1 to 8 carbon atoms including an alkyl group such as methyl, ethyl and propyl, an alkenyl group such as vinyl and allyl or an aryl group such as phenyl, and m is a number of 3 to 8 on the average. Illustrative examples include hexamethylcyclotrisiloxane, octamethylcyclotetrasiloxane, decamethylcyclopentasiloxane, 1,1-diethylhexamethylcyclotetrasiloxane, phenylheptamethylcyclotetrasiloxane, 1,1-diphenylhexamethylcyclotetrasiloxane, 1,2,3,4-tetramethyl-1,2,3,4-tetravinylcyclotetrasiloxane, 1,2,3,4-tetramethylcyclotetrasiloxane, dodecamethylcyclohexasiloxane, and 1,2,3,4-tetramethyl-1,2,3,4-tetraphenylcyclotetrasiloxane.

The end-blocked linear organopolysiloxanes used herein are preferably those of the general formula (II):

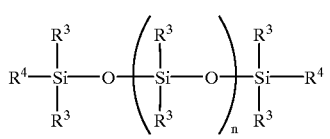

wherein $R^3$ is hydrogen or a monovalent hydrocarbon group of 1 to 8 carbon atoms, for example, an alkyl group such as methyl, ethyl or propyl, an alkenyl groups such as vinyl or allyl or an aryl group such as phenyl; $R^4$ is as defined for $R^3$ or a hydroxyl group or an organoxy group of 1 to 8 carbon atoms including an alkoxy group such as methoxy, ethoxy, propoxy, butoxy, pentoxy and hexoxy or an aryloxy group such as phenoxy; and n is a number of 0 to 40 on the average. Illustrative examples include hexamethyldisiloxane, octamethyltrisiloxane, decamethyltetrasiloxane, hexadecamethylheptasiloxane, hexaethyldisiloxane, tetramethyldiethyldisiloxane, tetramethyldivinyldisiloxane, tetramethyldihydroxydisiloxane, tetramethyldimethoxydisiloxane, octamethyldihydroxytetrasiloxane, and octamethyldimethoxytetrasiloxane.

In one preferred embodiment, a mixture of a major proportion of a cyclic organopolysiloxane and a minor proportion of an end-blocked linear organopolysiloxane is used as the low molecular weight organopolysiloxane because this enables to control as desired the number of siloxane units in the organopolysiloxane at the end of emulsion polymerization. Although the blending proportion of the two organopolysiloxanes is not critical, it is preferred to blend at least 70% by weight, especially at least 90% by weight of the cyclic organopolysiloxane. A blending proportion within this range facilitates to adjust the molar ratio of siloxane units in the final organopolysiloxane. The amount of the low molecular weight organopolysiloxane used is not critical although it is preferred to establish an organopolysiloxane concentration of 10 to 60% by weight, especially 20 to 50% by weight in the emulsion. A concentration of less than 10% by weight may make the emulsion industrially inefficient whereas an initial emulsion having an organopolysiloxane concentration of more than 60% by weight may be too viscous to work with.

In preparing an organopolysiloxane emulsion according to the invention, branching units may be introduced, if desired, in order to improve the durability of a protective film which is formed from the organopolysiloxane emulsion. Such branching units may be introduced, for example, by adding a trifunctional silane (such as methyltrimethoxysilane, phenyltrimethoxysilane, phenyltriethoxysilane, vinyltrimethoxysilane or ethyltriethoxysilane) or a hydrolytic condensate thereof, or a tetrafunctional silane (such as tetramethoxysilane or tetraethoxysilane) before polymerization is effected.

The above-mentioned trifunctional silane, hydrolytic condensate thereof or tetrafunctional silane is preferably added in an amount of up to 10% by weight, more preferably up to 1% by weight of the component (A). Although these components are not essential, it is preferred to add them in an amount of 0.01% by weight or more, especially 0.1% by weight or more of the component (A) when added.

Further in the practice of the invention, a hydrolyzable silane having an organic functional group, a hydrolytic condensate thereof or an organosiloxane oligomer having organic functional group-bearing siloxane units may be added to the organopolysiloxane prior to polymerization, insofar as the objects of the invention are not impaired. By adding such a component, organic functional groups can be introduced into the resulting organopolysiloxane. Exemplary organic functional groups are organic groups having acryloxy, methacryloxy, mercapto, carboxy, amino and epoxy. The organic functional group-bearing siloxane units are preferably introduced in an amount of up to 10 mol %, especially up to 5 mol % based on the low molecular weight organopolysiloxane (component (A)). Although these components are not essential, it is preferred to add them in an amount of 0.01 mol % or more, especially 0.1 mol % or more of the component (A) when added.

Illustrative examples of the hydrolyzable silane having an organic functional group are given below.

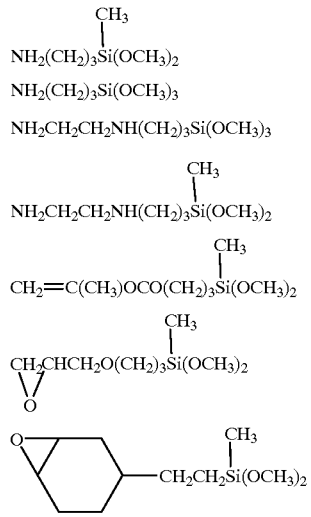

-continued

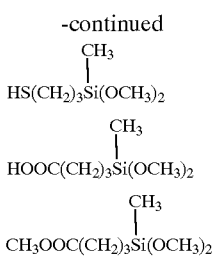

The organosiloxane oligomers having organic functional group-bearing siloxane units can be cyclic organopolysiloxanes or hydroxyl end-blocked linear organopolysiloxanes having about 3 to about 20 siloxane units obtained by hydrolysis of the above-described hydrolyzable silanes.

Component (B)

The anionic surfactant is selected from organic sulfonic acids and organic sulfates. Preferred are aliphatically substituted benzene sulfonic acids, polyoxyethylene aliphatic phenyl ether sulfates, aliphatic hydrogen sulfates, and ethoxylated aliphatic hydrogen sulfates which are represented by the following general formulae (III), (IV), (V) and (VI), respectively.

$$R^5C_6H_4SO_3H \tag{III}$$

$$R^5C_6H_4O(CH_2CH_2O)_pSO_3H \tag{IV}$$

$$R^6OSO_3H \tag{V}$$

$$R^6O(CH_2CH_2O)_qSO_3H \tag{VI}$$

wherein $R^5$ and $R^6$ are independently monovalent aliphatic hydrocarbon groups of at least 6 carbon atoms, p and q are integers of 1 to 20.

In formulae (III) to (VI), $R^5$ and $R^6$ are independently monovalent aliphatic hydrocarbon groups of at least 6 carbon atoms, preferably 6 to 18 carbon atoms, for example, hexyl, octyl, decyl, dodecyl, cetyl, stearyl, myristyl, oleyl, nonenyl, octynyl, and pentadecadienyl.

Illustrative examples of the anionic surfactants of formulae (III) to (VI) include hexylbenzenesulfonic acid, octylbenzenesulfonic acid, dodecylbenzenesulfonic acid, cetylbenzenesulfonic acid, octyl sulfate, lauryl sulfate, oleyl sulfate, cetyl sulfate, polyoxyethylene nonyl phenyl ether sulfates, polyoxyethylene dodecyl phenyl ether sulfates, ethoxylated lauryl sulfates, ethoxylated oleyl sulfates, and ethoxylated cetyl sulfates.

Moreover, anionic surfactants having weak catalysis may also be used in admixture with the component (B). Such anionic surfactants include sodium, potassium and ammonium salts of aliphatically substituted benzene sulfonic acids of formula (III), polyoxyethylene aliphatic phenyl ether sulfates of formula (IV), aliphatic hydrogen sulfates of formula (V), and ethoxylated aliphatic hydrogen sulfates of formula (VI). Illustrative examples are sodium dodecylbenzenesulfonate, sodium octylbenzenesulfonate, ammonium dodecylbenzenesulfonate, ammonium lauryl sulfate, triethanolamine lauryl sulfate, sodium lauryl sulfate, sodium polyoxyethylene nonylphenyl ether sulfates, ammonium ethoxylated lauryl sulfates, triethanolamine ethoxylated lauryl sulfates, and sodium ethoxylated lauryl sulfates. Besides, polyoxyethylene alkyl ether carboxylic acids or salts thereof such as polyoxyethylene lauryl ether acetic acid, polyoxyethylene stearyl ether acetic acid, sodium polyoxyethylene lauryl ether acetate, and sodium polyoxyethylene stearyl ether acetate may also be used with the component (B). The mineral acids such as hydrochloric acid, sulfuric acid and phosphoric acid can also be used in combination with the component (B) to promote polymerization of the component (A).

The amount of anionic surfactant (B) blended is preferably 0.1 to 10% by weight of the emulsion. With less than 0.1% by weight of component (B), the resulting emulsion would be insufficiently stable. More than 10% by weight of component (B) can exacerbate the parting property and heat resistance of the organopolysiloxane emulsion. The preferred amount is 0.5 to 5% by weight.

To further improve the stability of the organopolysiloxane emulsion resulting from emulsion polymerization according to the invention, another anionic surfactant, nonionic surfactant or ampholytic surfactant may be added prior to emulsion polymerization, subsequent to emulsion polymerization or subsequent to neutralization insofar as the objects of the invention are not impaired. Exemplary other anionic surfactants include salts of higher alkyl sulfates, alkyl phenyl ether sulfates, alkylbenzenesulfonates, higher alkyl phosphates, ethoxylated higher alkyl sulfates, ethoxylated alkyl phenyl ether sulfates, and ethoxylated higher alkyl phosphates. Exemplary nonionic surfactants include ethoxylated higher alcohols, ethoxylated alkyl phenols, polyhydric alcohol fatty acid esters, ethoxylated polyhydric alcohol fatty acid esters, ethoxylated fatty acids, ethoxylated fatty acid amides, sorbitol, sorbitan fatty acid esters, ethoxylated sorbitan fatty acid esters, and sucrose fatty acid esters. Exemplary ampholytic surfactants are those of amino acid and betaine types.

Component (C)

According to the invention, the low molecular weight organopolysiloxane (A) and the anionic surfactant (B) are emulsified and dispersed in water (C). The amount of water used is not critical although 30 to 89.9% by weight, especially 45 to 79.5% by weight of the emulsion is preferably used. With less than 30% by weight, the obtained emulsion may be too viscous to work with. With more than 89.9% by weight, the obtained emulsion may be industrially insufficient.

An organopolysiloxane emulsion is prepared by emulsifying and dispersing a low molecular weight organopolysiloxane (A) in an aqueous medium in the presence of at least one organic sulfonic acid or organic sulfate surfactant (B) to form an initial emulsion, subjecting the initial emulsion to polymerization, and neutralizing the emulsion.

According to the invention, the initial emulsion should have a mean particle size of up to 300 nm. At a mean particle size of more than 300 nm, polymerization reaction proceeds slowly, taking a longer time. A mean particle size of up to 250 nm is especially preferred.

The emulsifying and dispersing step to form the initial emulsion is carried out by charging a high-pressure emulsifier with components (A), (B) and (C) and operating the emulsifier under a high shear pressure of at least 500 kg/cm$^2$. A pressure of lower than 500 kg/cm$^2$ would be difficult to produce an initial emulsion with a mean particle size of up to 300 nm. At a pressure of higher than 3,000 kg/cm$^2$, a further reduction of mean particle size is not expectable. The preferred shear pressure is 500 to 3,000 kg/cm$^2$, especially 700 to 3,000 kg/cm$^2$. Exemplary high-pressure emulsifiers are an ultrahigh pressure Gaulin homogenizer, Micro-Fluidizer, and Nanomizer (all trade names). Prior to high-pressure emulsification, preliminary emulsification may be effected using a homomixer, Agi-homomixer (trade name), Combi-mixer (trade name) or colloid mill.

The thus obtained initial emulsion is subjected to polymerization at a temperature of preferably 10 to 80° C., more preferably 20 to 60° C. Temperatures above 80° C. may cause the stability of the emulsion to lower during polymerization reaction. The time of polymerization reaction is preferably 1 to 50 hours, more preferably 5 to 30 hours. Polymerization takes place while the emulsion is allowed to stand or mildly stirred.

At the end of polymerization reaction, a basic substance is added to neutralize the emulsion. Since the organopolysiloxane emulsion below pH 4 or above pH 9 may lose long-term stability, the pH value is preferably 4 to 9, and more preferably 5 to 8. Exemplary basic substances used herein are inorganic alkali compounds such as alkali metal hydroxides, alkaline earth metal hydroxides, alkali metal carbonates, and alkaline earth metal carbonates and organic alkali compounds such as ammonia and organic amines.

According to the invention, an organopolysiloxane emulsion having improved stability can be formed within a short time of polymerization.

EXAMPLES

Examples of the invention are given below by way of illustration and not by way of limitation. The viscosity is a measurement at 25° C.

Example 1

With stirring by means of a homomixer at 1,000 rpm, 100 g of a 10% dodecylbenzenesulfonic acid aqueous solution was slowly added dropwise to a mixture of 350 g of octamethylcyclotetrasiloxane and 0.8 g of hexamethyldisiloxane. After phase conversion and thickening, the agitation speed was increased to 5,000 rpm, at which agitation was continued for 15 minutes. This was diluted with 517.2 g of deionized water. The dilution was emulsified and dispersed twice in Micro-Fluidizer M-110Y (by Micro-Fluidex) under a pressure of 1,300 kg/cm$^2$. The mean particle size was measured by Coulter N4 Plus submicron particle size distribution analyzer (by Coulter), finding that the initial emulsion had a mean particle size of 190 nm. The emulsion was allowed to stand for 15 hours at 25° C. Thereafter, 32 g of a 10% sodium carbonate aqueous solution was added for adjustment to pH 7, obtaining a milky white emulsion having a mean particle size of 170 nm.

Isopropyl alcohol, 200 g, was added to 100 g of the emulsion to extract an organopolysiloxane. After drying, the viscosity of the organopolysiloxane was measured, finding 23,000 centipoise. The emulsion was allowed to stand over one month at room temperature whereupon no layer separation was found, indicating improved stability.

Comparative Example 1

A milky white emulsion was prepared as in Example 1 except that Micro-Fluidizer M-110Y was replaced by Gaulin homogenizer 15M-8TA (by APV Gaulin) and the pressure was changed from 1,300 kg/cm$^2$ to 300 kg/cm$^2$. At the end of emulsifying and dispersing step, the initial emulsion had a mean particle size of 320 nm. After polymerization and neutralization as in Example 1, the resulting emulsion had a mean particle size of 310 nm.

Isopropyl alcohol, 200 g, was added to 100 g of the emulsion to extract an organopolysiloxane. After drying, the viscosity of the organopolysiloxane was measured, finding 90 centipoise. This indicates that polymerization had not fully proceeded. The emulsion was allowed to stand over one month at room temperature whereupon it separated into two layers.

Example 2

A 2-liter polyethylene beaker was charged with 500 g of octamethylcyclotetrasiloxane and 1.8 g of phenyltriethoxysilane, which were uniformly mixed by a homomixer. To the flask were added 50 g of a 10% sodium lauryl sulfate aqueous solution and 50 g of a 10% dodecylbenzenesulfonic acid aqueous solution. The contents were emulsified for 10 minutes by the homomixer at 3,000 rpm. This was diluted with 383.1 g of deionized water. The dilution was emulsified and dispersed twice in an ultrahigh pressure Gaulin homogenizer LAB40-10RBFI (by APV Gaulin) under a pressure of 1,000 kg/cm$^2$, obtaining a stable emulsion. This emulsion had a mean particle size of 210 nm. The emulsion was transferred to a 2-liter glass flask equipped with a stirrer, thermometer, and reflux condenser where it was stirred for 24 hours at 50° C. and 80 rpm and then for 4 hours at 15° C. and 80 rpm. The resulting emulsion was neutralized with 9.8 g of a 10% sodium carbonate aqueous solution to yield a white emulsion of pH 5.5. The emulsion had a mean particle size of 180 nm.

Isopropyl alcohol, 200 g, was added to 100 g of the emulsion to extract an organopolysiloxane. After drying, there was obtained a non-flowing soft gel-like organopolysiloxane. A 5% toluene solution of the organopolysiloxane had a viscosity of 35 centipoise. The emulsion was allowed to stand over one month at room temperature whereupon no layer separation was found, indicating improved stability.

Comparative Example 2

A milky white emulsion was prepared as in Example 2 except that the ultrahigh pressure Gaulin homogenizer LAB40-10RBFI was replaced by Gaulin homogenizer 15M-8TA (by APV Gaulin) and the pressure was changed from 1,000 kg/cm$^2$ to 300 kg/cm$^2$. At the end of emulsifying and dispersing step, the initial emulsion had a mean particle size of 320 nm. After polymerization and neutralization as in Example 2, the resulting emulsion had a mean particle size of 290 nm.

Isopropyl alcohol, 200 g, was added to 100 g of the emulsion to extract an organopolysiloxane. After drying, there was obtained a paste-like organopolysiloxane. A 5% toluene solution of the organopolysiloxane had a viscosity of 12 centipoise. This indicates that polymerization had not fully proceeded. The emulsion was allowed to stand over one month at room temperature whereupon it separated into two layers.

Example 3

With stirring by means of a homomixer at 1,000 rpm, 100 g of a 10% dodecylbenzenesulfonic acid aqueous solution was slowly added dropwise to a mixture of 420 g of octamethylcyclotetrasiloxane and 0.4 g of hexamethyldisiloxane. After phase conversion and thickening, the agitation speed was increased to 5,000 rpm, at which agitation was continued for 15 minutes. This was diluted with 479.6 g of deionized water. The dilution was emulsified and dispersed twice in Micro-Fluidizer M-110Y under a pressure of 700 kg/cm$^2$. The initial emulsion had a mean particle size of 250 nm. The emulsion was allowed to stand for 24 hours at 25° C. Thereafter, 32 g of a 10% sodium carbonate aqueous solution was added for adjustment to pH 7, obtaining a milky white emulsion having a mean particle size of 210 nm.

Isopropyl alcohol, 200 g, was added to 100 g of the emulsion to extract an organopolysiloxane. After drying, the viscosity of the organopolysiloxane was measured, finding 110,000 centipoise. The emulsion was allowed to stand over one month at room temperature whereupon no layer separation was found, indicating improved stability.

Comparative Example 3

A milky white emulsion was prepared as in Example 3 except that Micro-Fluidizer M-110Y was replaced by Gaulin homogenizer 15M-8TA and the pressure was changed from 700 kg/cm$^2$ to 300 kg/cm$^2$. At the end of emulsifying and dispersing step, the initial emulsion had a mean particle size of 350 nm. After polymerization and neutralization as in Example 3, the resulting emulsion had a mean particle size of 320 nm.

Isopropyl alcohol, 200 g, was added to 100 g of the emulsion to extract an organopolysiloxane. After drying, the viscosity of the organopolysiloxane was measured, finding 200 centipoise. This indicates that polymerization had not fully proceeded. The emulsion was allowed to stand over one month at room temperature whereupon it separated into two layers.

Japanese Patent Application No. 10-241132 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing an organopolysiloxane emulsion comprising the steps of:

emulsifying and dispersing a low molecular weight organopolysiloxane (A) in water in the presence of at least one anionic surfactant (B) selected from organic sulfonic acids and organic sulfates under a high shear pressure of 700 to 3,000 kg/cm$^2$ to form an initial emulsion having a mean particle size of up to 300 nm, subjecting the initial emulsion to polymerization reaction, and neutralizing the emulsion.

2. The method of claim 1 wherein the low molecular weight organopolysiloxane (A) is a cyclic organopolysiloxane, a linear organopolysiloxane end-blocked with a triorganosilyl, diorganomonohydroxysilyl or diorganomonoalkoxysilyl group, or a mixture thereof.

3. The method of claim 1 wherein the initial emulsion has a mean particle size of up to 250 nm.

4. The method of claim 1 wherein the emulsifying and dispersing step uses 10 to 60% by weight of low molecular weight organopolysiloxane (A), 0.1 to 10% by weight of anionic surfactant (B), and 30 to 89.9% by weight of water (C) to form the initial emulsion.

5. The method of claim 4 wherein the emulsifying and dispersing step uses 20 to 50% by weight of low molecular weight organopolysiloxane (A), 0.5 to 5% by weight of anionic surfactant (B), and 45 to 79.5% by weight of water (C) to form the initial emulsion.

6. The method of claim 1 wherein the low molecular weight organopolysiloxane (A) contains at least 70% by weight of a cyclic organopolysiloxane.

7. The method of claim 6 wherein the low molecular weight organopolysiloxane (A) contains at least 90% by weight of a cyclic organopolysiloxane.

8. The method of claim 1 wherein a trifunctional silane, hydrolytic condensate thereof or tetrafunctional silane is further added to component (A).

9. The method of claim 8 wherein the trifunctional silane, hydrolytic condensate thereof or tetrafunctional silane is added in an amount of up to 10% by weight of component (A).

10. The method of claim 9 wherein the trifunctional silane, hydrolytic condensate thereof or tetrafunctional silane is added in an amount of up to 1% by weight of component (A).

11. The method of claim 1 wherein a hydrolyzable silane having an organic functional group, hydrolytic condensate thereof or organosiloxane oligomer having an organic functional group-bearing siloxane unit is further added to component (A).

12. The method of claim 1 wherein component (B) is at least one selected from the group consisting of anionic surfactants which are represented by the following general formulae (III), (IV), (V) and (VI);

$$R^5C_6H_4SO_3H \quad (III)$$

$$R^5C_6H_4O(CH_2CH_2O)_pSO_3H \quad (IV)$$

$$R^6OSO_3H \quad (V)$$

$$R^6O(CH_2CH_2O)_qSO_3H \quad (VI)$$

wherein $R^5$ and $R^5$ are independently monovalent aliphatic hydrocarbon groups of at least 6 carbon atoms, p and q are integers of 1 to 20.

13. The method of claim 1 wherein the polymerization is effected at a temperature of 10 to 80° C.

14. The method of claim 13 wherein the polymerization is effected at a temperature of 20 to 60° C.

15. The method of claim 1 wherein the polymerization is effected for 1 to 50 hours.

16. The method of claim 15 wherein the polymerization is effected for 5 to 30 hours.

17. The method of claim 1 wherein the emulsion is neutralized to pH 4 to 9.

18. The method of claim 17 wherein the emulsion is neutralized to pH 5 to 8.

* * * * *